(12) United States Patent
Gillette et al.

(10) Patent No.: US 7,787,833 B2
(45) Date of Patent: Aug. 31, 2010

(54) BROADBAND TRANSMITTER

(75) Inventors: Jay F Gillette, Lake Zurich, IL (US); Athena Leitzke, Huntley, IL (US)

(73) Assignee: General Instrument Corporation, Horsham, PA (US)

( * ) Notice: Subject to any disclaimer, the term of this patent is extended or adjusted under 35 U.S.C. 154(b) by 823 days.

(21) Appl. No.: 11/610,180

(22) Filed: Dec. 13, 2006

(65) Prior Publication Data

US 2008/0144735 A1 Jun. 19, 2008

(51) Int. Cl.
*H04B 1/02* (2006.01)
*H04Q 11/12* (2006.01)

(52) U.S. Cl. ............... 455/91; 455/115.1; 455/125; 375/298

(58) Field of Classification Search ............ 455/90, 455/108, 114.1, 120, 125, 114.2, 115.1, 91; 375/295, 298
See application file for complete search history.

(56) References Cited

U.S. PATENT DOCUMENTS

| 5,894,497 | A  * | 4/1999 | Overton ............... 375/295 |
| 6,240,274 | B1 * | 5/2001 | Izadpanah ............ 455/39 |
| 6,611,565 | B1 * | 8/2003 | Bada et al. .......... 375/295 |
| 7,539,464 | B2 * | 5/2009 | Suzuki et al. ........ 455/114.3 |

* cited by examiner

*Primary Examiner*—Sonny Trinh
(74) *Attorney, Agent, or Firm*—Larry T. Cullen

(57) ABSTRACT

A broadband transmitter includes a modulator and circuits for translating and conditioning the modulated signal to produce a modulated, analog signal at a predetermined frequency. A low-linearity power amplifier amplifies the analog signal at a predetermined frequency; the low-linearity amplifier benefits from having a smaller physical size and a lower heat dissipation. A micro-electro-mechanical systems (MEMS)-switched filter bank includes at least one MEMS switch and at least one filter. The MEMS-switched filter bank reduces in-band noise and harmonics from the amplified analog signal for transmission of the amplified analog signal at the predetermined frequency in the broadband network.

28 Claims, 5 Drawing Sheets

BROADBAND TRANSMITTER

BACKGROUND

Given the growing popularity of digital entertainment and services, such as digital cable television (CATV), video on demand (VoD), voice over Internet protocol (VoIP), high-speed Internet access, etc., various techniques have been implemented in broadband networks for delivering information to users. Many broadband networks use quadrature amplitude modulation (QAM) to deliver digital information to users. Typically, QAM transmitters are used to maximize the amount of information that may be transmitted to users via the network.

These transmitters require highly linear components to meet the channel transmission standards set forth by Data Over Cable Service Interface Specification (DOCSIS) or some other transmission specification being adhered to. In many instances, power amplifiers with high dissipation must be used to prevent harmonic distortion products which fall in-band and to prevent spectral spreading that can affect adjacent channels. These high dissipation amplifiers create a large amount of heat and are physically large, and both of these factors limit the maximum number of transmitters per board and per chassis. This decreases the channel density that can be provided and drives equipment costs up.

Furthermore, it is becoming more and more popular for content and service providers to make an increased amount of content available on-demand via broadband networks to users. To accommodate such trends, the broadband network infrastructure for delivering the programming, such as QAM transmitters, must be increased and may be provided at nodes closer to the user to provide these services without delay or other quality degradation. However, as described above, the high dissipation amplifiers conventionally used in transmitters produce a large amount of heat and are physically large. These factors limit the maximum number of transmitters that may be provided per board and per chassis, and can drive costs up, especially, when service providers may be increasing the number of transmitters being used to provide VoD and other services.

SUMMARY

A broadband transmitter includes a modulator and circuits for translating and conditioning the modulated signal to produce a modulated, analog signal at a predetermined frequency. A low-linearity power amplifier amplifies the analog signal at a predetermined frequency. A micro-electro-mechanical systems (MEMS)-switched filter bank includes at least one MEMS switch and at least one filter. The MEMS-switched filter bank reduces in-band noise and harmonics from the amplified analog signal for transmission of the amplified analog signal at the predetermined frequency in the broadband network.

By using a filter bank with a MEMS switch instead of other conventional switches, a lower linearity, lower voltage amplifier may be used. Typically, a high voltage amplifier having sufficient linearity is used, and thus a switched filter bank is not needed because a high voltage, high linearity amplifier produces minimal harmonic and intermodulation distortion. According to an embodiment, a lower voltage, lower linearity amplifier is used that may produce harmonics that affect in-band transmissions. A switched filter bank reduces or attenuates the in-band harmonics and spurious products. Furthermore, the switched filter bank uses MEMS switches instead of FET switches, because FET switches may produce harmonic and intermodulation distortion that cancel the improvements of the filtering performed by the filter bank.

The lower linearity amplifier is typically a lower voltage amplifier, and thus heat dissipation of the transmitter is reduced and possibly size of the transmitter is reduced. Thus, more transmitters may be provided per chassis, reducing deployment and operation costs of the infrastructure of the broadband network.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 1 illustrates a block diagram of a broadband transmitter, according to an embodiment;

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the embodiments.

According to an embodiment, a broadband transmitter includes MEMS switches after a final power amplification stage. The final power amplification stage may include an amplifier that has lower linearity performance and functions at a lower supply voltage than conventionally used.

Figure 1:
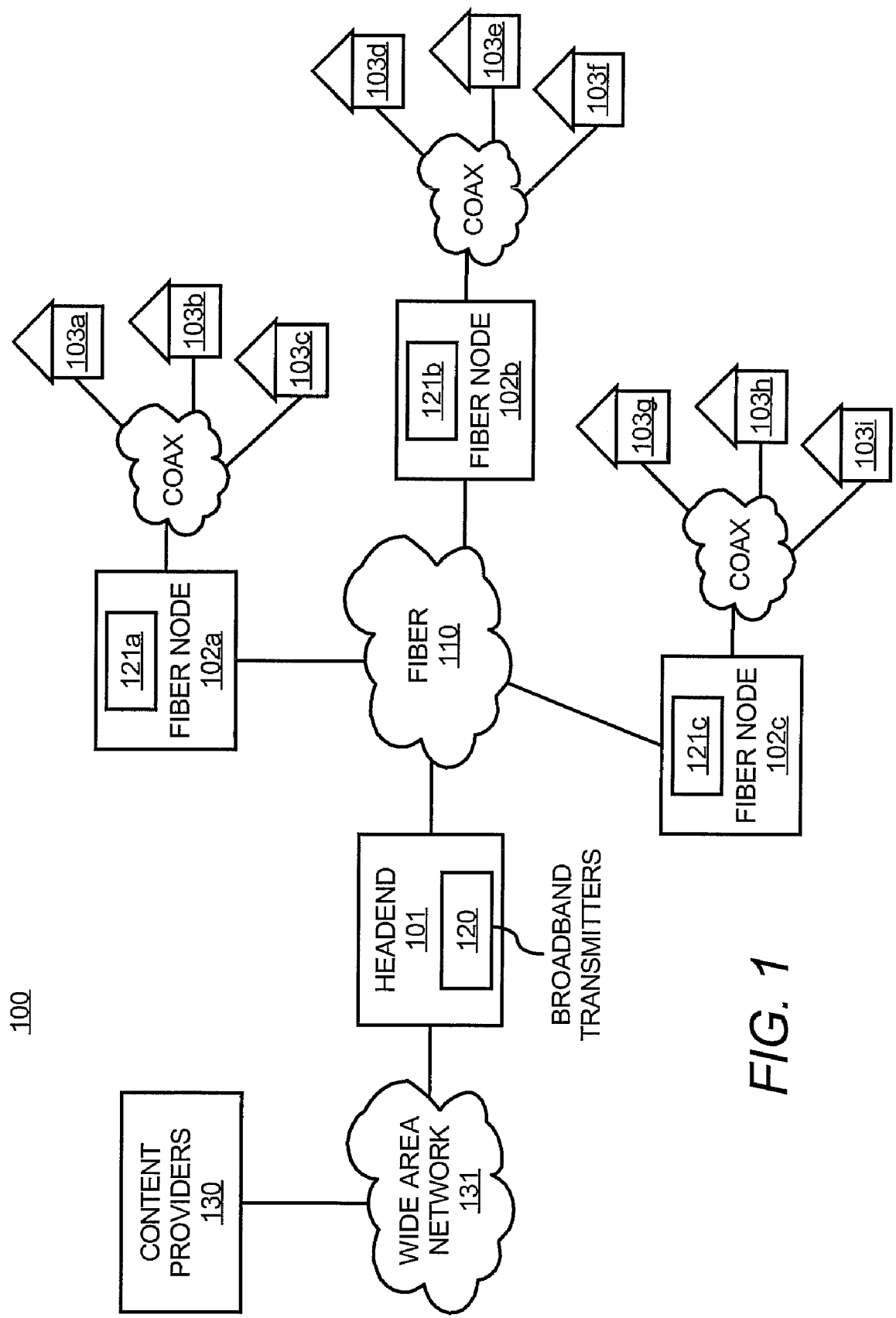
FIG. 1 illustrates a broadband network, according to an embodiment.

FIG. 1 illustrates a broadband network 100, according to an embodiment, where a broadband transmitter, such as the broadband transmitter 100 or 200 described below, may be used. The broadband network 100 represents a hybrid fiber-coaxial (HFC) network typically used for cable television systems. The broadband network 100 includes a headend 101 connected to fiber nodes 102*a-c* via fiber 110. The fiber nodes 102*a-c* are connected to customer premises 103*a-i* via coaxial cable 111*a-c*. Broadband transmitters 120, such as the broadband transmitter 200 or 300 may be provided at the headend for transmitting content to users. The content may be received from content providers 130 at the headend 101, for example, via the wide area network 131. Broadband transmitters 121*a-c* may optionally be provided at the fiber nodes 102*a-c*, especially for applications, such as VoD, where large amounts of content may be provided to users at any given time.

Figure 2:
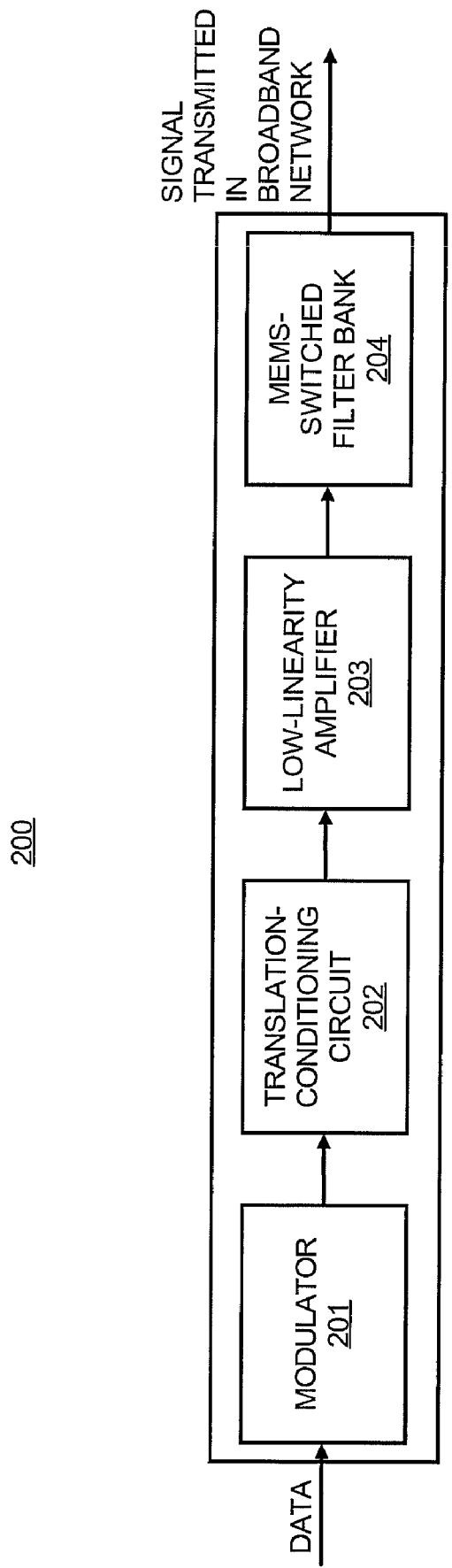
FIG. 2 illustrates a block diagram of a broadband transmitter, according to an embodiment.

FIG. 2 illustrates a block diagram of a broadband transmitter 200, according to an embodiment. A broadband transmitter is a transmitter operable to transmit signals in a broadband network. For example, data is received by the broadband transmitter 200, which may include content for users, and a signal, including the data, is generated for transmission in the broadband network. Signals may be transmitted at a particular frequency in the broadband network. For example, a transmission protocol, such as DOCSIS if transmitting on a cable broadband network, specifies channels for transmitting data in the network. Each channel occupies a frequency spectrum, and is specified by a center frequency and bandwidth parameters. Signals transmitted at a particular frequency in the network may include signals transmitted on a particular channel. All the channels, as specified by the transmission protocol, which may be used for transmitting data in the broadband network, are referred to as in-band. Out-of-band refers to frequencies outside the in-band frequencies.

One example of a broadband transmitter is a QAM transmitter. A QAM transmitter is operable to transmit a QAM modulated signal in the broadband network on a particular channel. A broadband transmitter may include other types of sources that modulate signals using other modulation schemes. For example, quadrature phase shift keying (QPSK) is a method of modulating digital signals onto a radio-frequency carrier signal using four phase states to code two digital bits. A QPSK transmitter is another example of a broadband transmitter.

Referring to FIG. 2, the broadband transmitter 200 includes a modulator 202, a translation-conditioning circuit 202, a low-linearity amplifier 203, and a MEMS-switched filter bank 204. The broadband transmitter 200 filters and amplifies signals to meet desired power and noise specifications for transmission in the broadband network. It will be apparent to one of ordinary skill in the art that the broadband transmitter 200 may include other circuits not shown, as known in the art, for generating a modulated signal for transmission in a broadband network.

The modulator 202 receives a signal and modulates the signal onto a carrier signal. The carrier signal may be a radio frequency (RF) signal, such as between 5 to 2000 MHz for cable television systems. The received signal may be a digital signal, and it is modulated according to the modulation scheme used by the modulator 202, such as QAM, QPSK, etc. The received signal may alternatively be an analog signal and the modulator 202 modulates the analog signal using a known modulation scheme.

The translation-conditioning circuit 202 receives the modulated signal from the modulator 202, and outputs an analog signal modulated at a particular frequency for transmission on a desired channel. The particular frequency may be a center frequency of the desired channel for transmitting the signal in the broadband network. The translation-conditioning circuit 202 may include one or more circuits for converting the signal output from the modulator 202 to an analog signal modulated at the desired frequency (i.e., translation) and for filtering the signal (i.e., conditioning). The translation-conditioning circuit 202 performs at least one type of translating and/or conditioning. For example, if the signal received from the modulator 202 is an analog signal modulated at the desired frequency, then no translation is performed. If the signal received from the modulator 202 is an analog signal but not modulated at the desired frequency, then the signal is converted to the desired frequency. If the signal received from the modulator 202 is a digital signal already at the desired frequency, then digital-to-analog conversion is performed but there is no need to convert the signal to the desired frequency.

The low-linearity amplifier 203 amplifies the signal output from the translation-condition circuit 202, which is an analog signal modulated at a particular frequency. Conventionally, high linearity 12 volt (V) biased amplifiers are utilized because they produce low harmonic distortion. However, the 12 V amplifiers generate a substantial amount of heat. The low-linearity amplifier 203 is a lower voltage amplifier that dissipates less heat. For example, a 5 V, an 8 V, or a combination of 5 and 8V amplifier may be used. Other lower voltage amplifiers may also be used.

The low-linearity amplifier 203 is less linear than the higher power amplifiers traditionally used. For example, the low-linearity amplifier 203 may produce harmonic and inter-modulation distortion products that are in-band and that can significantly degrade the transmitted signals. This may include even and odd-order harmonics falling in-band that may degrade the quality of the output signal to an unacceptable level, which may be based on the specifications set forth by the transmission protocol being used.

The MEMS-switched filter bank 204 uses one or more MEMS switches to select one or more filters for filtering harmonic distortion. Typical active FET-based switches used to select between output filters have poor linearity and cause distortion products that counteract the performance improvements of the filters. According to an embodiment, the MEMS-switched filter bank 204 uses MEMS switches to select a filter in the filter bank. The MEMS switches have much better linearity than FET-based switches and do not counteract the performance improvements of the filters in the filter bank. The signal output from the MEMS filter bank 204 is transmitted in the broadband network, for example, to a customer premises.

Figure 3:
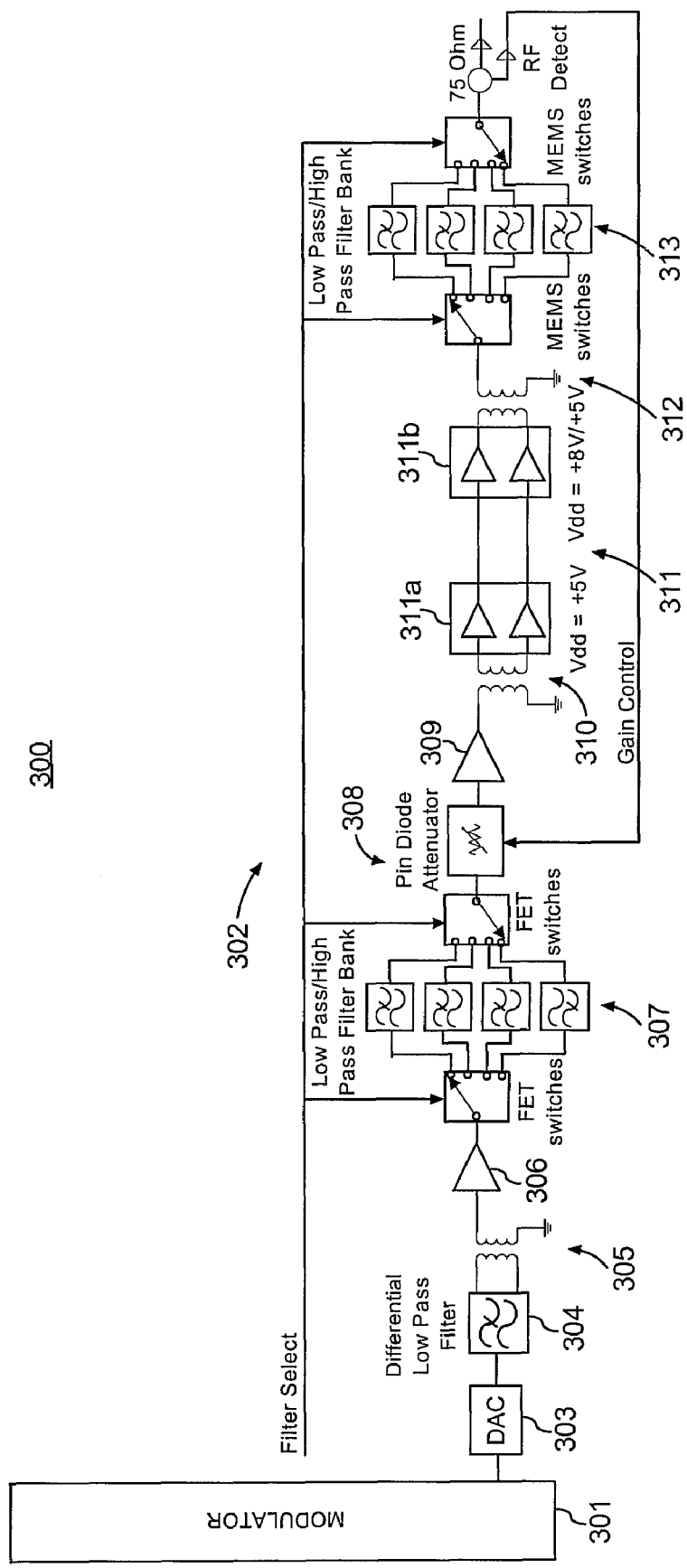
FIG. 3 illustrates a schematic block diagram of a broadband transmitter, according to an embodiment.

FIG. 3 illustrates a schematic block diagram of a broadband transmitter 300, according to an embodiment. The broadband transmitter 300 is one example of the broadband transmitter 200 shown in FIG. 2 and shows detailed circuits that may be used for the modulator 202, the translation-conditioning circuit 202, the low-linearity amplifier 203, and the MEMS filter bank 204. It will be apparent to one of ordinary skill in the art that some of the circuits may not be used or other circuits may be added or substituted for the circuits shown in FIG. 3.

The broadband transmitter 300 receives a digital signal and includes a digital modulator 301 for modulating the digital signal on a carrier signal. The modulator 301 may include an octal QAM modulator that outputs 8 QAM data streams via low voltage differential signaling (LVDS). The broadband transmitter 300 may include two of the same circuits, each handling four of the 8 QAM data streams. Only one of the circuits is shown as 302. The circuit 302, for example, receives four of the 8 QAM data streams. A digital-to-analog converter (DAC) 303 converts the data streams to analog signals. For example, four RF QAM signals at approximately −13 dBm (power ratio in decibels of the measured power referenced to 1 milliwatt) are output into a differential low pass filter 304.

The differential lowpass filter 304 removes out-of-band noise and spurious products. In addition, the differential nature of the output filter allows transition for a digital to analog/RF ground without allowing noise to couple between ground planes. The output of the differential lowpass filter 304 is terminated in an attenuator, and then is fed through a 1:1 transformer 305 for common-mode noise suppression and conversion to a single-ended 50 ohm signal. Conversion to a single-ended 50 ohm signal may be performed, because many off-the-shelf circuits, such as amplifiers, filters, etc. are designed for single-ended 50 ohm signals.

After being converted to a single-ended 50 ohm signal, a high gain amplifier 306, e.g., gain >12 dB, sets the carrier-to-noise ratio for the transmitter. Following the amplifier 306, a switched bank of filters 307 uses, for example, low distortion multi-position GaAs FET based RF switches. These filters provide attenuation of in-band noise and may include highpass, lowpass and/or bandpass filters making the aggregate output of the switched bank of filters 307 a strong bandpass response around the transmit channel or channels. These filters precede the power amplifiers in the final stage of amplification before transmitting the signal in the broadband network, and the filters do not reduce any harmonic or intermodulation products created by the power amplifiers.

The switched filter bank 307 is followed by a PIN diode based voltage variable attenuator 308. The PIN diode attenuator 308 is the major source of gain adjustability in the broadband transmitter 300, as such it must compensate for component gain/loss tolerance, frequency and temperature variability as well as the power range specified by the transmission protocol, such as 10 (decibels) dB output power range specified by DOCSIS 2.0. Instead of a PIN diode attenuator 308, other attenuators may be used.

After the PIN diode attenuator 308, the signal is converted from single-ended 50 ohms to a differential 75 ohm signal using the amplifier 309 and transformer 310. Power amplifier 311 is used to increase the gain of the signal. In this example, the power amplifier 311 includes two amplifiers 311a and 311b. The first amplifier 311a drives the second amplifier 311b. Together these amplifiers provide approximately 40 dB of gain. The amplifiers generally have high linearity, such as OIP2>60 dBm and OIP3>42 dBm, but may not provide linearity performance as high as needed to meet protocol specifications. For example, the amplifiers 311a and 311b may be low voltage amplifiers that create in-band harmonic distortion that would not be produced by a higher voltage amplifier, such as a 12 V amplifier.

In this example of the amplifiers 311, the first amplifier 311a is supplied 5V. The second amplifier 311b operates from a supply switched between 5V and 8V, and its bias current may be varied. The 5V and 8V supplies may be provided from an off-board supply, which reduces the power dissipation of the transmitter, rather than from an adjustable on-board regulator. An off-board or on-board switch may be used to switch between different supply voltages or other know techniques may be used to perform the supply voltage switching. A variable supply voltage line is shown to illustrate that different supply voltages may be provided depending on the desired linearity for the amplifiers.

The supply voltage for the amplifier 311b is varied to trade linearity for dissipation. At frequencies where harmonics of the carrier are out-of-band, e.g., above 430 MHz, the supply could be switched to 5 V and a drastic reduction in heat dissipation, such as approximately 40%, may be attained in this range frequency of operation. This linearity reduction could substantially degrade adjacent channel power performance; as a result this parameter should be carefully scrutinized. The 8 V supply may be used at frequencies where harmonics of the carrier are in-band, because use of the higher voltage supply results in less harmonic distortion being generated. Also, a predetermined threshold may be used to determine whether to switch from the low supply voltage to the high supply voltage or vice versa to maintain a desired linearity of the amplifier, for example, to meet DOCSIS specifications. For example, the threshold may be empirically determined based on the observed linearity of the amplifier under certain conditions in the lab. Although not shown, the first amplifier 311a may also be supplied with a variable voltage supply to improve heat dissipation.

Following the amplifier 311, a transformer 312 is used to convert to a single-ended 75 ohm signal. Following the transformer 312, a MEMS-switched bank of filters 313 attenuates both harmonic distortion and noise. The MEMS switches are used to select the correct filter in the bank based on the transmit frequency. Also, a path between the MEMS switches may be provided that is a pass-through with no filter, because there may be situations where no filtering is needed.

Since the MEMS-switched filter bank 313 follows the amplifier 311, it is important that the insertion loss is minimized to limit degradation of the amplifier's 311 linearity performance. The MEMS-switched filter bank 313 may only be followed by a coupler and then an output connector, which connects directly to the broadband network, and thus the MEMS-switched filter bank return loss must be sufficiently high to meet the output return loss specification of the protocol being used. Since conventional reflective filters only have acceptable return loss in the passband and effectively present an open-circuit (or high impedance mismatch) in the reject band, these filters are not suited for use following the power amplifier 311.

Unlike FET switches, the MEMS switches have high-linearity performance and do not produce substantial unwanted spurious products, like FET switches. MEMS switches provide improved linearity and reduced insertion loss over FET switches. Commercially available MEMS RF switches have extremely high linearity performance, such as P1 dB>30 dBm, OIP2>70 dBm and OIP3>60 dBm, and very low insertion loss. Use of MEMS-switched resistive filters along with low voltage power amplifiers may drastically reduce the heat dissipation of a broadband transmitter, such as a DOCSIS 3.0 (or greater) capable transmitter, while fulfilling or exceeding the return loss, noise and spurious specifications.

The MEMS switches and the FET switches are used to select a desired filter in the filter bank to transmit on a particular channel. A filter select line is shown for selecting the filters from the filter banks to transmit on a particular channel in the broadband network. For example, a processor, not shown, may generate signals on the filter select line to select the filters to transmit on a particular channel.

The broadband transmitter outputs a single-ended 75 ohm signal on a channel in the broadband network. The 75 ohm signal is used for transmission on a coaxial line or may be converted to another signal type for transmission on fiber or another medium in the broadband network.

Figure 4:
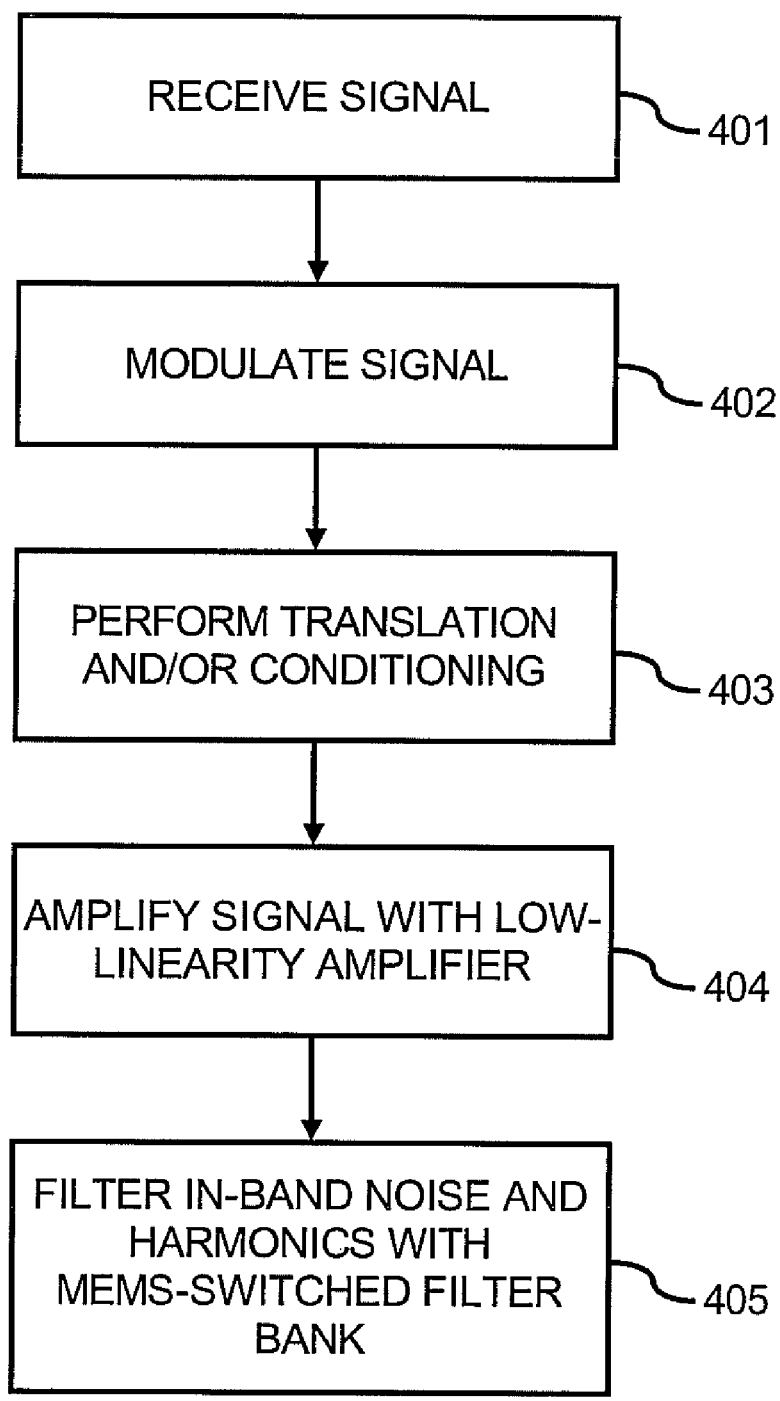
FIG. 4 illustrates a flow chart of a method for transmitting information in a broadband network, according to an embodiment.

FIG. 4 illustrates a method 400 for generating a signal for transmission on a broadband network, according to an embodiment. The method 400 is described with respect to FIG. 2 by way of example and not limitation. At step 401, the broadband transmitter 100 receives a signal. The signal may include content for a user, such as digital cable content for transmission to customer premises.

At step 402, the signal is modulated by the modulator 201. The modulator 201 may perform digital modulation if a digital signal is received.

At step 403, the translation-conditioning circuit 202 performs at least one of translation and conditioning of the modulated signal to generate an analog signal at a predetermined frequency for transmission on a desired channel.

At step 404, the low-linearity amplifier 203 amplifies the modulated analog signal at the predetermined frequency. The low-linearity amplifier may be low voltage and as a result may produce undesirable in-band noise and harmonics, but dissipates less heat than a high-voltage amplifier with better linearity.

At step 405, the MEMS-switched filter bank 204 selects a filter to filter in-band noise and harmonics from the amplified analog signal for transmission of the amplified analog signal at the predetermined frequency in the broadband network.

One or more MEMS switches are used instead of FET switches, because the MEMS switches provide improved linearity and reduced insertion loss.

Figure 5:
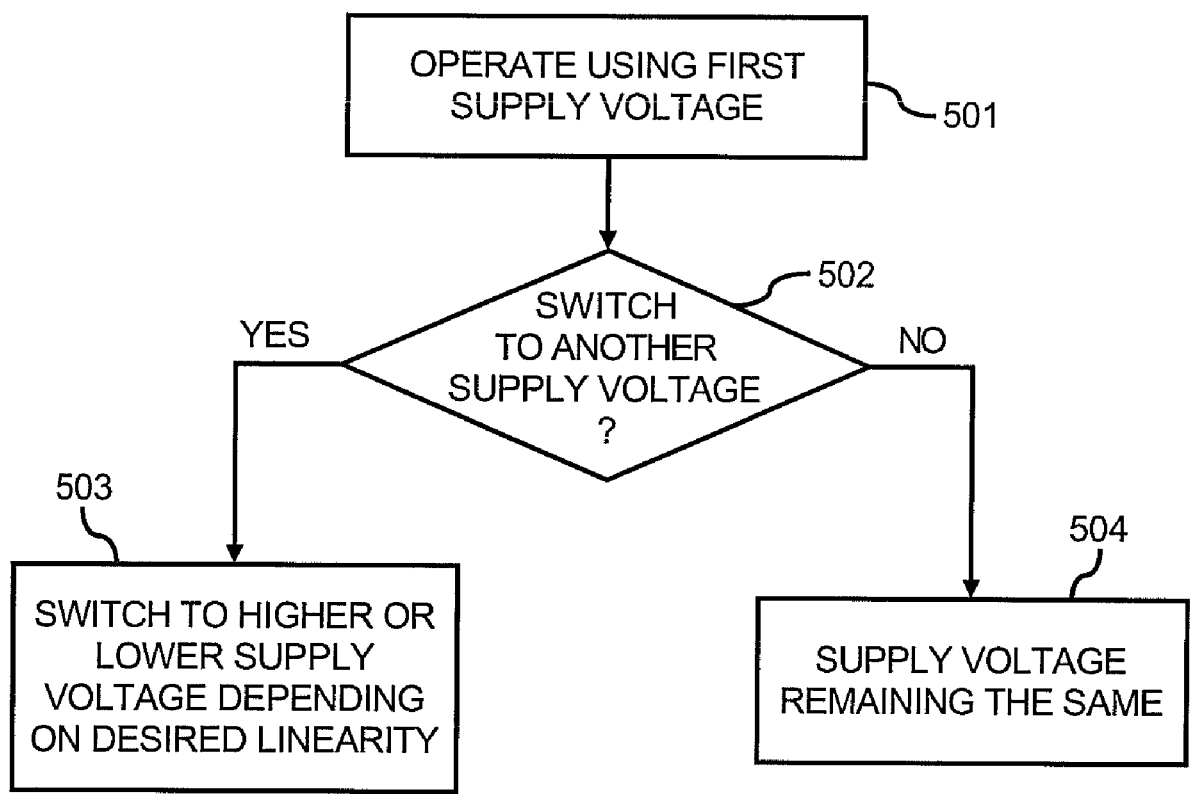
FIG. 5 illustrates a flow chart of a method for determining when to change a variable supply voltage for a last-stage amplifier provided before a MEMS-switched filter bank, according to an embodiment.

FIG. 5 illustrates a method 500 for determining when to change a variable supply voltage for a last-stage amplifier provided before a MEMS-switched filter bank. For example, as described with respect to FIG. 3, the supply voltage for the amplifier 311b and/or the amplifier 311a is varied to trade linearity for dissipation. At frequencies where harmonics of the carrier are out-of-band, e.g., above 430 MHz, the supply could be switched to 5 V and a drastic reduction in heat dissipation may be attained. Also, a predetermined threshold, associated with the amplifier linearity, may be used to determine when to switch the supply voltage.

At step 501, the last-stage amplifier operates using a first supply voltage. This may be a low or a high supply voltage. At step 502, a determination is made as to whether the supply voltage is to be switched to another supply voltage based on the linearity of the amplifier. At steps 503 and 504, the supply voltage is switched if needed. For example, if the linearity needs to be improved, the higher supply voltage is used. If a lower linearity may be sufficient, such as when harmonics of the carrier are out-of-band or as determined by a threshold comparison, the low supply voltage is used.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A broadband transmitter operable to transmit in-band signals in a broadband network, the broadband transmitter comprising:
   a modulator producing a modulated signal;
   a receiver for receiving the modulated signal and outputting an analog signal at a predetermined frequency;
   a low-linearity amplifier amplifying the analog signal at the predetermined frequency; and
   a micro-electro-mechanical systems (MEMS)-switched filter bank including at least one MEMS switch and at least one filter, wherein the MEMS-switched filter bank reduces in-band noise and harmonics from the amplified analog signal for transmission of the amplified analog signal at the predetermined frequency in the broadband network,
   wherein the low-linearity amplifier is operable to function using at least two input voltages including a higher voltage and a lower voltage, wherein the amplifier has a lower linearity when functioning at the lower voltage.

2. The broadband transmitter of claim 1, wherein at least one of the in-band noise and harmonics are created by the low-linearity amplifier and are filtered by the MEMS switch filter bank.

3. The broadband transmitter of claim 1, wherein the MEMS-switched filter bank comprises a plurality of filters, and the at least one MEMS switch selects one or more of the filters for reducing the in-band noise and harmonics.

4. The broadband transmitter of claim 3, wherein the at least one MEMS switch comprises two MEMS switches for selecting a filter of the plurality of filters.

5. The broadband transmitter of claim 1, wherein the at least one MEMS switch provides higher linearity lower insertion loss than other conventional switches, which allows the low-linearity amplifier to be used instead of a high-linearity amplifier.

6. The broadband transmitter of claim 5, wherein the low-linearity amplifier is a lower power amplifier and has lower heat dissipation than the high-linearity amplifier.

7. The broadband transmitter of claim 1, wherein the low-linearity amplifier has a lower linearity than a higher-voltage amplifier that is operable to provide the same amplification as the low-linearity amplifier but produces less in-band noise and less in-band harmonics.

8. The broadband transmitter of claim 1, wherein the modulator comprises a digital modulator.

9. The broadband transmitter of claim 8, wherein the modulator comprises a digital quadrature amplitude modulator.

10. The broadband transmitter of claim 1, wherein the modulator comprises an analog modulator.

11. The broadband transmitter of claim 1, further comprising a translation and condition circuit which performs at least one of converting the modulated signal to the predetermined frequency and filtering the modulated signal.

12. The broadband transmitter of claim 11, wherein the translation and conditioning circuit includes a digital-to-analog converter converting the modulated signal to an analog signal.

13. The broadband transmitter of claim 1, wherein the broadband transmitter generates a quadrature amplitude modulated analog signal for transmission on an in-band digital cable channel in the broadband network.

14. The broadband transmitter of claim 13, wherein the broadband network comprises a hybrid fiber coaxial network.

15. The broadband transmitter of claim 14, wherein the quadrature amplitude modulated analog signal comprises a single-ended 75 ohm signal operable to be transmitted over coaxial cable.

16. A method of generating a signal for transmission on a broadband network, the method comprising:
   receiving a signal with data;
   modulating the signal;
   performing translation or conditioning of the modulated signal to generate an analog signal at a predetermined frequency;
   amplifying the modulated analog signal at the predetermined frequency using a low-linearity amplifier; and
   using at least one MEMS switch to select a filter to filter in-band noise and harmonics from the amplified analog signal for transmission of the amplified analog signal at the predetermined frequency in the broadband network,
   wherein at least some of the in-band harmonics are created by the low-linearity amplifier, and wherein the low-linearity amplifier is operable to function using at least two supply voltages including a higher voltage and a lower voltage, and the method comprises:
   switching between the lower and higher supply voltages to minimize power consumption and to maintain a linearity of the low-linearity amplifier in order to provide the signal that meets transmission protocol specifications for transmission on the broadband network.

17. The method of claim 16, wherein modulating the signal comprises quadrature amplitude modulating the signal.

18. The method of claim 16, further comprising:
   transmitting the amplified analog signal at the predetermined frequency on a hybrid fiber-coaxial network to a user.

19. A broadband transmitter operable to transmit in-band signals in a hybrid fiber coaxial network to customer premises, the broadband transmitter comprising:

a quadrature amplitude modulator receiving a digital signal including content to be transmitted to at least one customer premises and quadrature amplitude modulating the digital signal;

at least one circuit for converting the quadrature amplitude modulated digital signal to an analog signal at a predetermined frequency;

a low-linearity amplifier amplifying the analog signal at the predetermined frequency; and a MEMS-switched filter bank including at least one MEMS switch and at least one filter, wherein the MEMS-switched filter bank reduces in-band noise and harmonics from the amplified analog signal for transmission of the amplified analog signal at the predetermined frequency in the hybrid fiber-coaxial network to the customer premises.

20. The broadband transmitter of claim 19, wherein the MEMS-switched filter bank comprises a plurality of filters, and the at least one MEMS switch selects one or more of the filters for reducing the in-band noise and harmonics.

21. The broadband transmitter of claim 19, wherein the low-linearity amplifier is a lower power amplifier and has lower heat dissipation than the high-linearity amplifier.

22. The broadband transmitter of claim 19, wherein the quadrant amplitude modulator comprises a digital quadrature amplitude modulator.

23. The broadband transmitter of claim 19, wherein the modulator comprises an analog quadrature amplitude modulator.

24. The broadband transmitter of claim 19, further comprising a translation and condition circuit which performs at least one of converting the modulated signal to the predetermined frequency and filtering the modulated signal.

25. The broadband transmitter of claim 24, wherein the translation and conditioning circuit includes a digital-to-analog converter converting the modulated signal to an analog signal.

26. The broadband transmitter of claim 19, wherein the broadband transmitter generates a quadrature amplitude modulated analog signal for transmission on an in-band digital cable channel in the broadband network.

27. The broadband transmitter of claim 19, wherein the quadrature amplitude modulated analog signal comprises a single-ended 75 ohm signal operable to be transmitted over coaxial cable.

28. The broadband transmitter of claim 19, wherein the low-linearity amplifier is operable to function using at least two input voltages including a higher voltage and a lower voltage, wherein the amplifier has a lower linearity when functioning at the lower voltage.

* * * * *